US012138693B2

(12) United States Patent
Eichelberger (10) Patent No.: US 12,138,693 B2
(45) Date of Patent: Nov. 12, 2024

(54) CLAMPING TOOL HOLDER (71) Applicant: Kennametal Inc., Latrobe, PA (US)

(72) Inventor: Samuel Eichelberger, Trafford, PA (US)

(73) Assignee: KENNAMETAL INC., Latrobe, PA (US)

( * ) Notice: Subject to any disclaimer, the term of this patent is extended or adjusted under 35 U.S.C. 154(b) by 119 days.

(21) Appl. No.: 17/404,115

(22) Filed: Aug. 17, 2021

(65) Prior Publication Data
US 2023/0053686 A1   Feb. 23, 2023

(51) Int. Cl.
*B23B 27/16*   (2006.01)

(52) U.S. Cl.
CPC .... *B23B 27/1677* (2013.01); *B23B 2205/045* (2013.01); *B23B 2260/03* (2013.01)

(58) Field of Classification Search
CPC ............ B23B 27/1677; B23B 27/1644; B23B 27/1651; B23B 27/1648; B23B 27/1625; B23B 2260/03; B23B 2205/045; B23B 2205/04; Y10T 407/2282; Y10T 407/2284
See application file for complete search history.

(56) References Cited

U.S. PATENT DOCUMENTS

| | | | | |
|---|---|---|---|---|
| 4,477,212 A | * | 10/1984 | Kraft | B23B 27/1651 407/112 |
| 5,100,268 A | * | 3/1992 | Nakayama | B23B 27/1677 407/104 |
| 6,457,914 B1 | * | 10/2002 | Andras | B23B 27/1677 407/107 |
| 7,547,163 B2 | | 6/2009 | Morrison et al. | |
| 8,057,131 B2 | | 11/2011 | Conway et al. | |
| 8,496,414 B2 | * | 7/2013 | Mochizuki | B23B 27/1677 407/107 |
| 10,596,634 B2 | | 3/2020 | Forsberg et al. | |

(Continued)

FOREIGN PATENT DOCUMENTS

| | | |
|---|---|---|
| IE | 42806 B1 * | 10/1980 |
| JP | 6-023648 A2 | 2/1994 |

(Continued)

OTHER PUBLICATIONS

Description JP2009113185A (translation) obtained at https://worldwide.espacenet.com/ (last visited Sep. 21, 2022).*

(Continued)

*Primary Examiner* — Ryan Rufo
(74) *Attorney, Agent, or Firm* — Christopher J. Owens (57) ABSTRACT

A clamping tool holder includes a tool holder body and a clamp for clamping a cutting insert. The clamp causes the cutting insert to press against the bottom and the side walls of an insert-receiving pocket of the tool holder body. The tool holder body has an inclined surface sloping inward in a direction away from the insert-receiving pocket. The clamp has an inclined surface that acts as a ramp with the inclined surface of the tool holder body. When a clamp screw is tightened, a nub of the clamp engages an inside rearward surface of a mounting bore of the insert with face contact and a contact pad engages a top surface of the cutting insert. As a result, the clamp exerts a force downward and rearward force on the insert. In one aspect, the nub has a polygonal cross-sectional shape.

14 Claims, 5 Drawing Sheets

(56) References Cited

U.S. PATENT DOCUMENTS

| | | |
|---|---|---|
| 11,285,548 B2 * | 3/2022 | Hecht ................. B23C 5/006 |
| 2006/0140728 A1 | 6/2006 | Giannetti |
| 2007/0283794 A1 | 12/2007 | Giannetti |
| 2013/0216320 A1 | 8/2013 | Baca, Jr. et al. |
| 2018/0161885 A1 | 6/2018 | Forsberg et al. |
| 2018/0369923 A1 | 12/2018 | Chen et al. |
| 2019/0001454 A1 | 1/2019 | Huang |
| 2019/0160549 A1 | 5/2019 | Amstibovitsky et al. |
| 2019/0366444 A1 | 12/2019 | Henzler et al. |
| 2020/0030885 A1 | 1/2020 | Mun et al. |
| 2020/0030888 A1 * | 1/2020 | Henzler ............. B23B 27/1625 |
| 2020/0230710 A1 | 7/2020 | Hirano et al. |

FOREIGN PATENT DOCUMENTS

| | | | | |
|---|---|---|---|---|
| JP | 2000296402 A | * | 10/2000 | |
| JP | 2009039833 A | * | 2/2009 | |
| JP | 2009113185 A | * | 5/2009 | |
| JP | 2011115923 A | * | 6/2011 | |
| WO | WO-2009096516 A1 | * | 8/2009 | .............. B23C 5/06 |
| WO | 2018/143089 A1 | | 8/2018 | |

OTHER PUBLICATIONS https://en.wikipedia.org/wiki/Engineering_tolerance (last visited Oct. 25, 2022).*

* cited by examiner

CLAMPING TOOL HOLDER

CROSS-NOTING TO RELATED APPLICATIONS

This application is related to application Ser. No. 11/879,189, filed Jul. 16, 2007, entitled "Clamping Tool Holder", now U.S. Pat. No. 7,547,163, and application Ser. No. 12/355,778, filed Jan. 17, 2009, entitled "Clamping Tool Holder", now U.S. Pat. No. 8,057,131, the entire contents of which are incorporated herein by reference.

FIELD OF THE INVENTION

The present invention pertains to a clamping tool holder. More particularly, the present invention relates to a clamping tool holder for releasably securing an insert to the clamping tool holder.

BACKGROUND OF THE INVENTION

Typically, tool holder mechanisms utilize a conical bore whose axis is offset from the threaded section of the locking pin receiving hole to tilt the locking pin into abutment with the cutting insert. These designs are difficult to machine because the location of the conical bore must be maintained within a relatively tight tolerance if it is to achieve the desired tilting of the locking pin.

One solution is to clamp the insert using a clamping nub. Unfortunately, it has been discovered that in this solution, the clamping nub often has single point contact with the mounting bore of the insert. The single point of contact generates high localized compressive stress, which leads to plastic deformation of the clamping nub. With each index of the insert, the clamping nub experiences more localized compressive stress and more deformation. The deformation continues until the contacting surface of the clamping nub work hardens enough to withstand the stress. Each time the clamping nub deforms, the clamp is torqued into a slightly different position, which affects insert clamping/retention. Therefore, there is a need to provide a tool holder for clamping an insert that reduces stress, reduces deformation and increases clamping consistency.

SUMMARY OF THE INVENTION

The problem of excessive stress and deformation of the clamp is solved by providing a nub with at least two contact areas that provide a larger face contact area, as compared to a conventional nub that provides only line contact between the nub and the mounting bore of the insert.

In one aspect of the invention, a tool holder for releasably clamping an insert comprises a tool holder body including an insert-receiving pocket formed at a forward end thereof and having a bottom and at least one side wall for receiving the insert. The tool holder body further includes a clamp-securing bore having a central axis forming an angle with respect to a plane of the tool holder body. A clamp is arranged on the tool holder body. The clamp includes a forward nose portion with a downward-extending nub. The clamp further includes a top surface portion, a bottom surface portion, and an aperture formed therethrough. A clamp screw is capable of being inserted through the aperture of the clamp and at least partially received in the clamp-securing bore of the tool holder body to bring the clamp into pressing engagement with the insert. The nub is generally polygonal in cross-sectional shape comprising a first contact surface and a second contact surface. The first contact surface and the second contact surface of the nub are formed with a radius, R, that is approximately equal to a radius of a mounting bore of an insert, thereby providing face contact between the mounting bore of the insert and the clamp when the clamp is brought into pressing engagement with the insert.

In another aspect of the invention, a clamp for a tool holder, comprises a nose portion with a downward extending nub; and a contact pad extending outward from a bottom surface portion for engaging a top surface of an insert when the tool holder is placed in a clamped position. The contact pad surrounds the nub. The nub is generally polygonal in cross-sectional shape comprising a first contact surface and a second contact surface. The first contact surface and the second contact surface of the nub are formed with a radius, R, that is approximately equal to a radius of a mounting bore of an insert, thereby providing face contact between a mounting bore of the insert and the clamp when the clamp is brought into pressing engagement with the insert.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
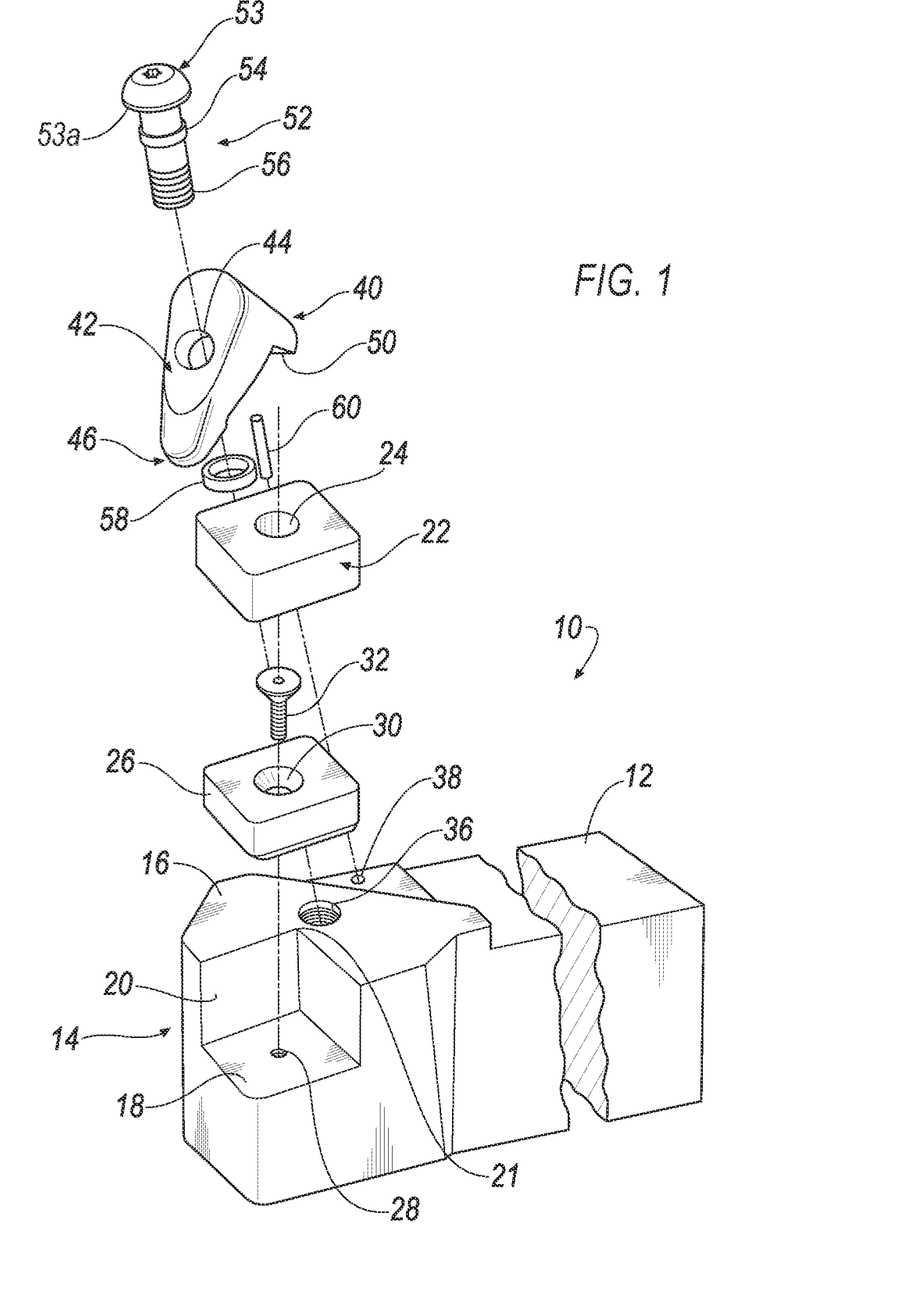
FIG. 1 is an exploded side perspective view of a clamping tool holder in accordance with an embodiment of the invention.
Figure 2:
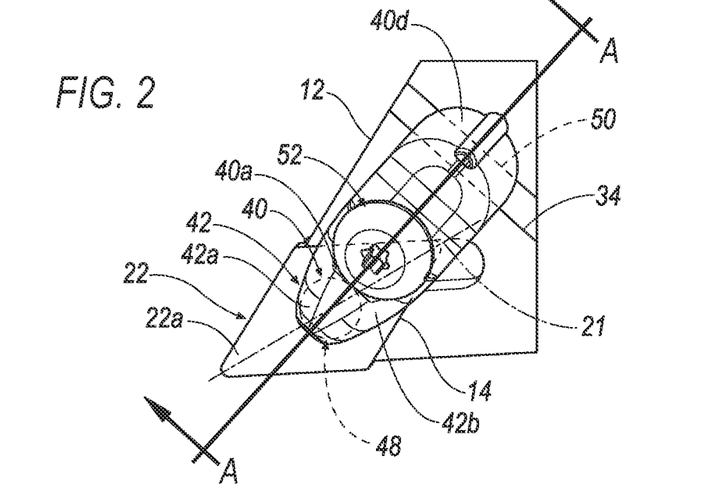
FIG. 2 is a top view of the clamping tool holder in accordance with an embodiment of the invention.

Referring now to FIGS. 1-8, a clamping tool holder 10 is shown according to an embodiment of the invention. The clamping tool holder 10 comprises a tool holder body 12 having an insert-receiving pocket 14 formed in its upper surface 16 at a corner of its forward end portion. The insert receiving pocket 14 has a bottom 18 and angularly-disposed side walls 20 forming an apex 21 at the intersection between the side walls 20. An insert 22 having a mounting bore 24 formed therethrough is disposed on the bottom 18 of the pocket 14 with a seat member 26 therebetween. Although the insert 22 can be any shape, the illustrated insert 22 is generally diamond in shape having a top surface 22a (FIG. 2). An internally threaded bore 28 is formed in the bottom 18 of the pocket 14, and a bore 30 having an upper portion tapering downward is formed through the seat member 26. The seat member 26 is fixedly secured to the insert-receiving pocket 14 by means of a countersunk screw 32 inserted through the bore 30 and screwed into the threaded bore 28. In an alternative embodiment, the insert 22 can be disposed on the bottom 18 of the pocket 14 without the use of the seat member 26 and the head screw 32. In this alternative embodiment, it is not necessary to include the threaded bore 28 in the tool holder body 12.

Figure 3:
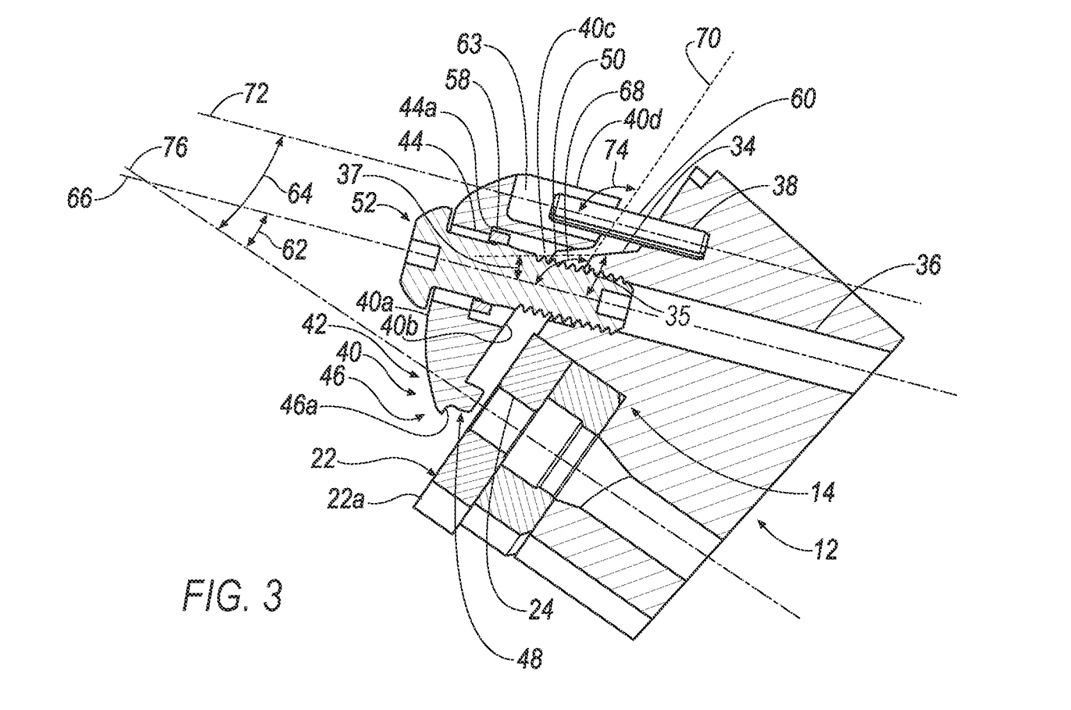
FIG. 3 is a partial cutaway cross-sectional view of the clamping tool holder in an unclamped position taken along line A-A of FIG. 2.
Figure 4:
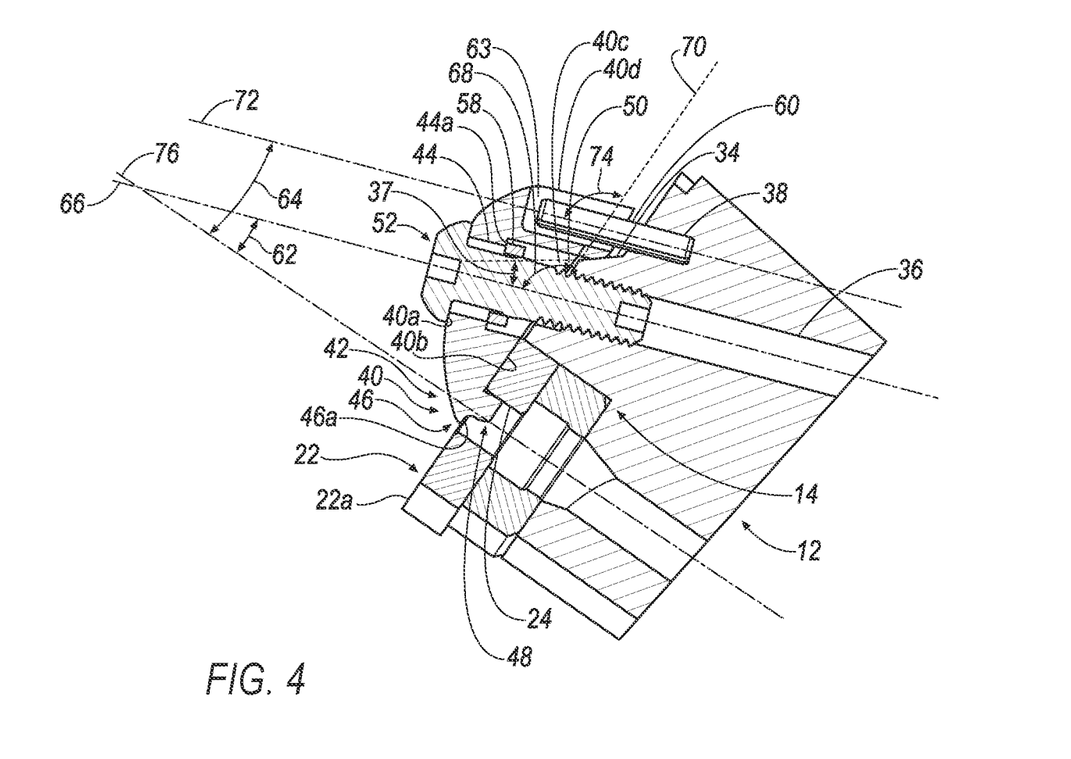
FIG. 4 is a partial cutaway cross-sectional view of the clamping tool holder in a clamped position taken along line A-A of FIG. 2.

As seen in FIGS. 3 and 4, an inclined surface 34 sloping inwardly in a direction away from the insert-receiving pocket 14 is formed on that portion of the upper surface 16 of the tool body 12 that is displaced rearwardly of the tool body 12 with respect to the pocket 14. An internally threaded clamp-securing bore 36 is formed in the tool holder 10 and is located between the inclined surface 34 and the insert-receiving pocket 14. The inclined surface 34 is formed at a prescribed angle 35 with respect to a central axis 66 of the clamp-securing bore 36. In an embodiment, the angle 35 is about 24 degrees. In this embodiment, the central axis 66 of the clamp-securing bore 36 forms an angle 68 that is not perpendicular to a plane 70 of the body 12.

The tool holder 10 further includes a pin-receiving bore 38 formed in the body 12 of the tool holder 10. The pin-receiving bore 38 maintains alignment of the clamp 40 and the tool body 12 as the clamp 40 presses downward and rearward on the insert 22. In the illustrated embodiment, the inclined surface 34 is located between a pin-receiving bore 38 and the clamp-securing bore 36. Alternatively, the pin-receiving bore 38 can be located between the inclined surface 34 and the clamp-securing bore 36. In this embodiment, a central axis 72 of the pin-receiving bore 38 is substantially parallel with the central axis 66 of the clamp-securing bore 36. Thus, the central axis 72 of the pin-receiving bore 38 forms an angle 68 that is not perpendicular to a plane 70 of the body 12, as shown in FIGS. 3 and 4.

Figure 5:
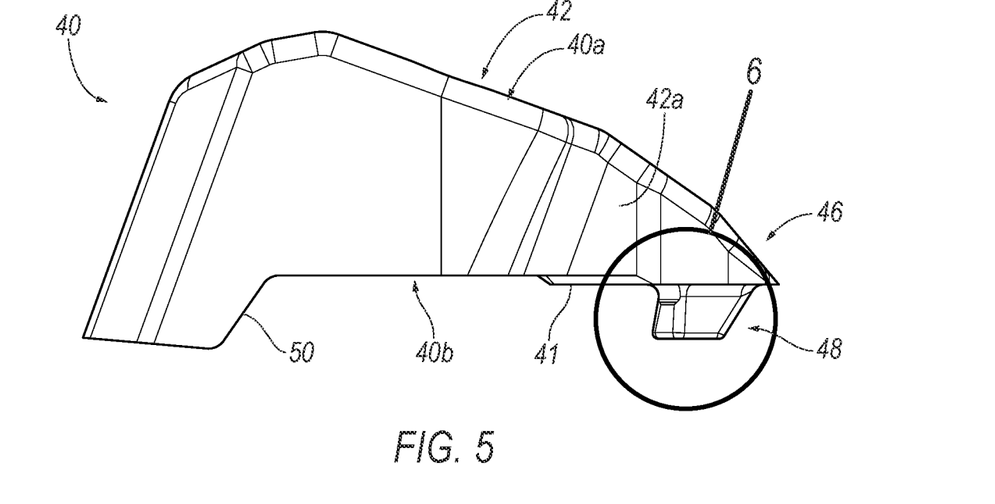
FIG. 5 is a side view of a clamp in accordance with an alternate embodiment of the invention.

A clamp 40 is arranged on the upper surface 16 of the tool holder body 12. As shown in FIGS. 3 and 5, the clamp 40 is of a generally C-shape in side elevation having a tapered forward portion 42 and tapered side portions 42a, 42b to provide a low profile design. The low profile design facilitates the removal of chips during the cutting process. As shown in FIGS. 3 and 4, a generally circular aperture 44 is formed in the center of the clamp 40. Alternatively, the aperture 44 can be non-circular or oblong-shaped having a greater dimension along the longitudinal axis of the body 12, so long as a sufficient seal of the clamp screw can be achieved. As shown in FIGS. 3 and 4, the aperture 44 is formed so that its central axis is substantially concentric with the central axis 66 of the clamp-securing bore 36 of the tool body 12. The clamp 40 also includes a substantially planar top surface portion 40a and a substantially planar bottom surface portion 40b. As shown in FIG. 5, the forward end 42 of the clamp 40 also includes and a substantially planar contact pad 41 extending outward (i.e., in a downward direction when the clamp 40 is viewed in side elevation) from the lower surface portion 40b that acts as a seating surface for engaging the top surface 22a of the insert 22 when the tool holder 10 is placed in the clamped position. Because the bottom surface 40b of the clamp 40 is formed to be higher in elevation than the contact pad 41, the bottom surface 40b does not engage the insert 22 when the contact pad 41 is brought into engagement with the top surface 22a of the insert 22.

Referring to FIG. 3, the clamp 40 has an inclined surface 50 formed at a proximal end thereof so as to protrude downward and rearward with respect to the clamp-securing bore 36. The inclined surfaces 34, 50 act as ramp surfaces when the tool holder 10 is moved from an unclamped position to a clamped position, and vice versa. However, the inclined surface 50 is formed at an angle 37 with respect to the central axis 66 of the clamp-securing bore 36 that is slightly different than the angle 35 of the inclined surface 34 of the tool holder 10.

It should be noted that the relative angle between the clamp-securing bore 36 and the inclined surfaces 34, 50 can be "tuned" to provide a desired downward force and/or rearward force on the insert 22. In one embodiment, the angle of the clamp-securing bore 36 of the inclined surfaces 34, 50 are approximately 24 degrees with respect to the central axis 66 of the clamp-securing bore 36 to provide slightly more downward force than rearward force on the insert 22. However, it will be appreciated that the relative angle between the clamp-securing bore 36 and the inclined surfaces 34, 50 may be any desired angle to provide the desired ratio of downward to rearward force on the insert 22.

The clamp 40 also includes a pin-receiving bore 63 positioned between the inclined surface 50 and a rear surface 40d of the clamp 40. As shown in FIGS. 3 and 4, the pin-receiving bore 63 of the clamp 40 is formed so that its axis is substantially concentric with the axis of the pin-receiving bore 38 of the body 12 of the tool holder 10. A guide pin 60 is disposed within the pin-receiving bores 38, 63 to prevent the clamp 40 from spinning or twisting in an axial direction (in a direction perpendicular to the direction of travel of the clamp screw 52) when turning of the clamp screw 52 to loosen or tighten the clamp 40. Although the guide pin 60 can be formed of a solid pin, the guide pin 60 is preferably formed of a slotted spring pin that can flex, expand or compress to allow for variations in design and wear of the tool holder 10. The guide pin 60 can be press fit into the pin-receiving bore 38 of the tool holder body 12. The length of the guide pin 60 is selected to allow the clamp 40 to move away from the insert 22 while preventing the clamp 40 from spinning or twisting in the axial direction.

It will be appreciated that the diameter of the pin-receiving bore 63 can be slightly larger than the diameter of the guide pin 60 to allow free movement of the guide pin 60 within the pin-receiving bore 63. It will be appreciated that the pin-receiving bore 63 and the guide pin 60 can be eliminated by forming the inclined surfaces 34, 50 with convex, concave or contour complementary shaped surfaces. Oppositely, the inclined surfaces 34, 50 can be eliminated and made integral with the guide pin 60 or attached as a separate component when retrofitting a conventional tool holder.

Referring back now to FIGS. 1-4, the clamp 40 is secured to the tool holder body 12 by means of a clamp screw 52 having a head portion 53, a shoulder 54 and a threaded portion 56. The head portion 53 includes a lower face 53a that is substantially perpendicular to the central axis 66 of the clamp-securing bore 36, as shown in FIG. 1.

During assembly of the tool holder 10, the threaded portion 56 is inserted through the aperture 44 and screwed into the threaded clamp-securing bore 36. It will be appreciated that the threads of the bore 36 may be slightly larger than the threads of the clamp screw 52 to allow for variations in design, i.e. manufacturing tolerances in the tool holder 10.

In one embodiment, a ring 58 can be press-fit to the shoulder 54 to assist in lifting the clamp 40 when the tool holder 10 is moved from the clamped position to the unclamped position, as seen in FIGS. 3 and 4. The ring 58 engages a surface 44a of the clamp 40 to lift the clamp 40 from clamped to unclamped position. However, the ring 58 is not necessary for lifting the clamp 40 from the tool holder 10. In an alternate embodiment, the ring 58 is omitted and replaced with a spring (not shown) to assist in lifting the clamp 40. In this embodiment, the bottom of the tapered spring abuts the shoulder 54 of the clamp screw 52. It will be appreciated that the invention is not limited by the use of a spring, and that the invention can be practiced using any means for providing a biasing force to assist in lifting the clamp when the tool holder 10 is moved from the clamped position to the unclamped position.

Figure 6:
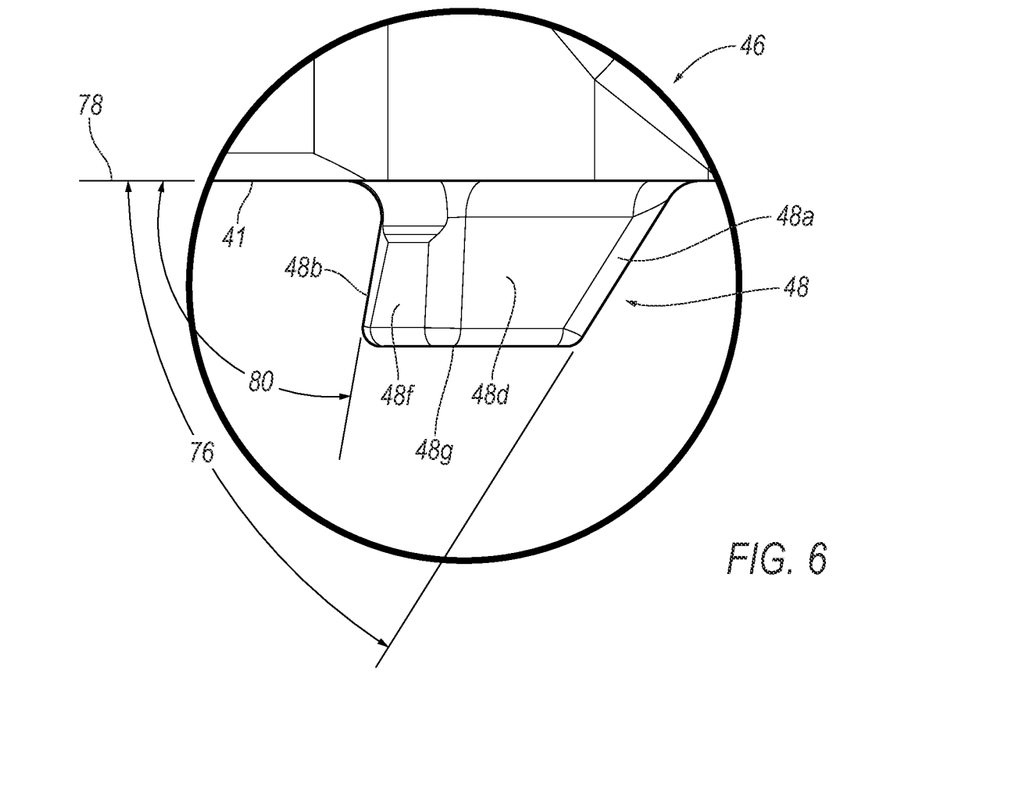
FIG. 6 is an enlarged side view of the nose portion and a nub of the clamp in accordance with an embodiment of the invention.
Figure 7:
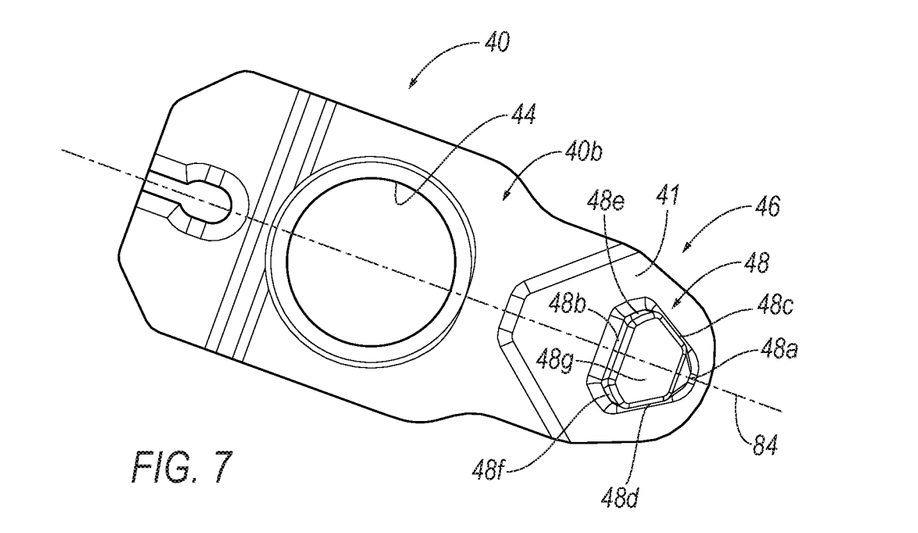
FIG. 7 is a bottom view of the clamp of FIG. 5.
Figure 8:
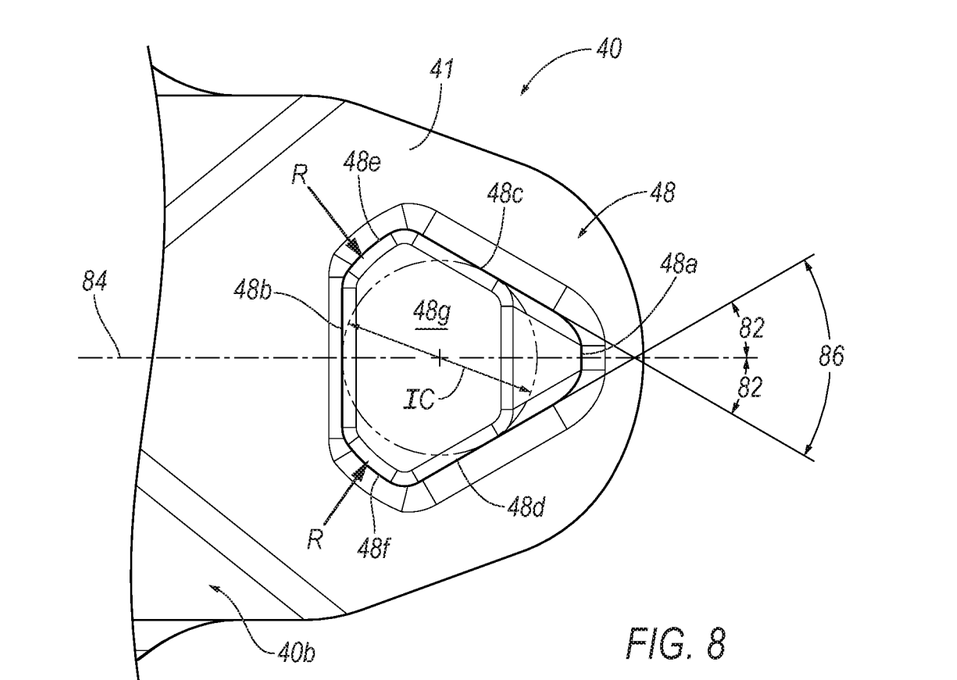
FIG. 8 is an enlarged bottom view of the nub of the clamp of FIG. 7.

Referring now to FIGS. 5-8, one aspect of the invention is that the forward end of clamp 40 includes an arcuate-shaped nose portion 46 with a downwardly-extending nub 48 that engages the mounting bore 23 of the insert 22 in a face contact manner when the tool holder 10 is brought into the clamped position. As seen in FIGS. 7 and 8, the nub 48 is surrounded by the contact pad 41 of the clamp 40. In general, the nub 48 has a generally polygonal cross-sectional shape. In the illustrated embodiment, the nub 48 is generally hexagonal in cross-sectional shape with six sides comprising a front wall 48a, a rear wall 48b opposite the front wall 48a, a first angled wall 48c, a second angled wall 48d, a first contact surface 48e and a second contact surface 48f. The nub 48 also has a substantially planar bottom surface 48g.

As seen in FIG. 6, the angled front wall 48a is substantially planar and is formed at an angle 76 with respect to a plane 78 that is substantially parallel to the planar bottom surface 48g of the nub 48 to provide clearance for the nub 48 when inserting the nub 48 into the mounting bore 24 of the insert 22. In one embodiment, for example, that angle 76 is in a range between about 45 degrees and about 75 degrees with respect to the plane 78. In another embodiment, for example, the angle 76 is in a range between about 55 degrees to about 60 degrees. In the illustrated embodiment, the angle 76 is about 58 degrees. However, it will be appreciated that the invention is not limited by the magnitude of the angle 76, and that the invention can be practiced with any desirable angle so long as clearance for the nub 48 is provided.

In addition, the rear wall 48b is substantially planar and formed at an angle 80 with respect to the plane 78. It should be noted that the angle 80 of the rear wall 48b is greater than the angle 76 of the front wall 48a. In one embodiment, for example, that angle 80 is in a range between about 75 degrees and about 85 degrees with respect to the plane 78. In the illustrated embodiment, the angle 80 is about 80 degrees. However, it will be appreciated that the invention is not limited by the magnitude of the angle 80, and that the invention can be practiced with any desirable angle so long as clearance for the nub 48 is provided.

As seen in FIG. 8, the first angled wall 48c is substantially planar and is formed at an angle 82 with respect to a central, longitudinal axis 84 of the clamp 40. In the illustrated embodiment, the nub 40 is mirror symmetric about the central, longitudinal axis 84. Therefore, the second angled wall 48d is substantially planar and is formed at the same angle 82 with respect to the central, longitudinal axis 84 of the clamp 40. In one embodiment, the angle 82 is in a range between about 25 degrees and about 45 degrees. For example, the angle 82 can be about 30 degrees. Thus, the first angled wall 48c is formed at an angle 86 of about 60 degrees (i.e., 2×30 degrees=60 degrees) with respect to the second angled wall 48d. However, it will be appreciated that the invention is not limited by the magnitude of the angle 82, and that the invention can be practiced with any desirable angle so long as clearance for the nub 48 is provided. It should be noted that the rear wall 48b and the first and second angled walls 48c, 48d of the nub 48 are sized so as to contact an inscribed circle, IC, as shown in FIG. 8.

Unlike the first and second angled walls 48c, 48d, the first and second contact surfaces 48e, 48f are formed with a radius, R. As a result, the first and second surfaces 48e, 48f are rounded or arcuate in shape. The purpose of the radius, R, is to provide face contact with the mounting bore 24 of the insert 22, rather than line contact as in conventional clamping devices. To achieve face contact, rather than line contact, between the nub 48 and the mounting bore 24 of the insert 22, the magnitude of the radius, R, is ideally identical to the radius of the mounting bore 24. Thus, the magnitude of the radius, R, depends on the dimensions of the mounting bore 24 of the insert 22. In the illustrated embodiment, for example, the radius, R, is about 2.6 mm (0.10 inches). As a result of face contact between the nub 48 and the mounting bore 24 of the insert 22, the stresses during clamping of the insert 22 are distributed over a larger area of the nub 48, thereby resulting in significantly less stress (Stress=Force/Area) and less deformation, as compared to clamping devices with line contact between the nub and the insert. Finite Element Analysis (FEA) studies have shown that there is about 83.4% reduction in stress between the clamp 40 of the invention providing face contact between the insert and the clamp and a conventional clamp providing line contact between the insert and the clamp.

Referring back to FIGS. 3 and 4, the central axes 66, 72 of the clamp-securing bore 36 and the pin-receiving bore 38, respectively, are at angle 62, 64 with respect to a central axis 76 of the nub 48. In an embodiment, the angles 62, 64 are approximately 20 degrees that causes the first and second contacts surfaces 48e, 48f of the nub 48 to face contact the rearward inner surface of the mounting bore 24 and exert a force rearward on the insert 22. In addition, the forward lower surface 40b of the clamp 40 engages the top surface 22a of the insert 22 to exert a force downward on the insert 22. Thus, the clamp 40 of the invention provides three-point contact between the insert 22 and the clamp 40 to pull the insert downward and rearward into the pocket 14 of the tool holder 10, as shown in FIG. 4.

With reference to FIGS. 3 and 4, the clamping operation of the tool holder 10 using the clamp 40 of the invention will now be described. Usually, because the clamping operation is required only when replacing the cutting insert with a new one, it is normally not necessary to move the clamp 40 upward from the clamped position shown in FIG. 4 to the unclamped position shown in FIG. 3. Therefore, there may be provided a stop member (not shown) to prevent the clamp screw 52 from being further loosened from the unclamped position shown in FIG. 3.

From the unclamped position shown in FIG. 3, the clamp screw 52 is rotated in a clockwise direction to screw the clamp screw 52 into the clamp-securing bore 36 and cause the clamp 40 to move downward and rearward with respect to the insert 22. The clamp 40 is guided by guide pin 60 as it moves downward and rearward along the axis of the pin-receiving bore 38 of the body 12 of the tool holder 10. In one embodiment, the nub 48 of the clamp 40 moves in a direction that is not in alignment with the apex 21 of the pocket 14. In another embodiment, it may be desirable to have the clamp 40 pull directly through the apex 21 to create equal clamping pressure on both side walls 20 of the pocket 14.

As the clamp 40 is further tightened by turning the clamp screw 52, the contact surfaces 48e, 48f of the nub 48 positively engages the rear inner surface of the mounting bore 24 of the insert 22. It should be noted that the contact pad 41 of the clamp 40 engages the top surface 22a of the insert 22 when in the clamped position. As the clamp 40 is further tightened, the lower face 53a of the clamp screw 52 engages the top surface 40a of the clamp 40, further causing the contact pad 41 of the nose portion 46 of the clamp 40 to press against the top surface 22*a* of the insert 22. Further, as shown in FIG. 4, the inclined surfaces 34, 50 act as a ramp to further cause the clamp 40 to press the insert 22 downward and rearward to further secure the insert 22 to the pocket 14.

As mentioned earlier, one aspect of the invention is that there is face contact between the inner surface of the mounting bore 24 of the insert 22 and the contact surfaces 48*e*, 48*f* of the nub 48 when the clamp 40 is brought into pressing engagement with the insert 22. Another aspect of the invention is that the lower face 40*b* of the clamp 40 does not engage the insert 22 when the clamp 40 is brought into pressing engagement with the insert 22 because the lower face 40*b* is formed at a higher elevation than the contact pad 41 of the nose portion 46. Yet another aspect of the invention is that the inclined surfaces 34, 50 are formed at different angles 35, 37 with respect to the central axis 66 of the bore 36, thereby causing the clamp 40 to further bring the face contact of the contact surfaces 48*e*, 48*f* of the nub 48 into pressing engagement with the rear inner surface of the mounting bore 24 of the insert 22.

It will be appreciated that the invention is not limited by the type and shape of the insert 22, and that the invention can be practiced with any desirable shape and type of insert. For example, when the insert 22 is triangular in shape, rather than square or rectangular, the receiving pocket 14 can also be triangular in shape to accommodate the shape of the insert 22.

When removing the insert 22 from the tool holder body 12, the clamp screw 52 is rotated in a counter clockwise direction to cause the ring 58 to engage the lower face of the clamp 40 to assist in lifting the clamp 40. As the clamp screw 52 is further rotated, the inclined surface 50 is separated from the inclined surface 34, as shown in FIG. 3. In this released position, the nose portion 46 of the clamp 40 is positioned above the insert 22 such that the insert 22 can be easily removed and replaced by a new insert. Accordingly, the clamp 40 is released such that replacing operation for the insert 22 can be conducted efficiently.

The patents and publications referred to herein are hereby incorporated by reference.

Having described presently preferred embodiments the invention may be otherwise embodied within the scope of the appended claims.

What is claimed is:

1. A tool holder, comprising:
    a tool holder body including an insert-receiving pocket formed at a forward end thereof, the insert-receiving pocket having a bottom and at least one side wall for receiving the insert, the tool holder body further including a clamp-securing bore having a central axis forming an angle with respect to a plane of the tool holder body;
    a clamp arranged on the tool holder body, the clamp including a forward nose portion with a downward-extending nub, the clamp including a top surface portion, a bottom surface portion, and an aperture formed therethrough;
    a cutting insert mounted in the insert-receiving pocket, the cutting insert including a mounting bore having a radius; and
    a clamp screw capable of being inserted through the aperture of the clamp and at least partially received in the clamp-securing bore of the tool holder body to bring the clamp into pressing engagement with the cutting insert,
    wherein the nub is polygonal in cross-sectional shape comprising a first contact surface and a second contact surface, and
    wherein the first contact surface and the second contact surface of the nub are formed with a radius, R, that is identical to the radius of the mounting bore of the cutting insert, thereby providing face contact between the mounting bore of the cutting insert and the clamp when the clamp is brought into pressing engagement with the cutting insert.

2. The tool holder according to claim 1, wherein the radius, R, is about 2.6 mm.

3. The tool holder according to claim 1, wherein the nub is hexagonal in cross-sectional shape further comprising a front wall, a rear wall opposite the front wall, a first angled wall, and a second angled wall.

4. The tool holder according to claim 3, wherein the first angled wall and the second angled wall are formed at an angle with respect to a central, longitudinal axis of the clamp, and wherein the angle is in a range between about 25 degrees and about 45 degrees.

5. The tool holder according to claim 3, wherein the front wall is formed at a non-orthogonal angle with respect to a plane that is substantially parallel to a bottom surface of the nub for providing clearance for the nub when inserting the nub into the mounting bore of the insert.

6. The tool holder according to claim 5, wherein the angle is in a range between about 55 degrees and about 60 degrees.

7. The tool holder according to claim 1, wherein the tool holder includes an inclined surface having a first prescribed angle with respect to the central axis of the clamp-securing bore, wherein the clamp further includes an inclined surface formed at a second prescribed angle with respect to the central axis of the clamp-securing bore, and wherein the first prescribed angle is different than the second prescribed angle.

8. The tool holder according to claim 1, wherein the tool holder body also includes a pin-receiving bore having a central axis formed at an angle with respect to the plane of the tool holder body.

9. The tool holder according to claim 8, wherein the central axis of the pin-receiving bore is substantially parallel to the central axis of the clamp-securing bore.

10. The tool holder according to claim 8, wherein the central axis of the pin-receiving bore intersects the central axis of the clamp-securing bore at an angle.

11. The tool holder according to claim 1, wherein the clamp screw further includes a head portion with a lower face that is substantially perpendicular to the central axis of the clamp-securing bore.

12. The tool holder according to claim 1, wherein the angle formed by the central axis of the nub with respect to the plane of the tool holder body is approximately equal to ninety degrees.

13. The tool holder according to claim 3, wherein the rear wall, the first angled wall and the second angled wall of the nub contact an inscribed circle, IC, of the nub.

14. The tool holder according to claim 1, wherein a forward lower surface of the clamp also engages a top surface of the insert, thereby providing three-point contact between the insert and the clamp to pull the insert downward and rearward into the insert-receiving pocket of the tool holder when the clamp is brought into pressing engagement with the insert.

* * * * *